(No Model.)

T. L. MAXHEIMER.
Fastening for Bird Cages.

No. 230,795. Patented Aug. 3, 1880.

Witnesses:
Willy J. E. Schultz.
John C. Tunbridge.

Inventor:
Theo. L. Maxheimer
by his attorney
A. v. Briesen

UNITED STATES PATENT OFFICE.

THEODORE L. MAXHEIMER, OF NEW YORK, N. Y.

FASTENER FOR BIRD-CAGES.

SPECIFICATION forming part of Letters Patent No. 230,795, dated August 3, 1880.

Application filed April 27, 1880. (No model.)

*To all whom it may concern:*

Be it known that I, THEODORE L. MAXHEIMER, of New York, in the county and State of New York, have invented a new and Improved Fastener for Bird-Cages, of which the following is a specification.

My invention relates to a device for preventing parrots and other caged birds from opening sliding cage-doors.

The invention consists of a hook adapted to be hung to a bar of the cage-door for uniting it with one of the bars or wires of the cage in such a manner that when the door is closed the hook prevents the door from being opened from the inside; but the said hook can be readily turned from the outside when it is desired to open the door.

Figure 1:
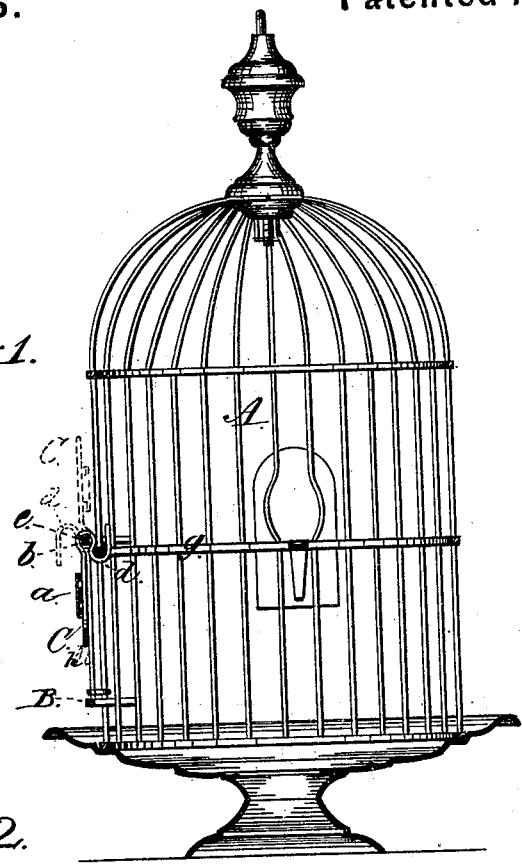
Figure 2:
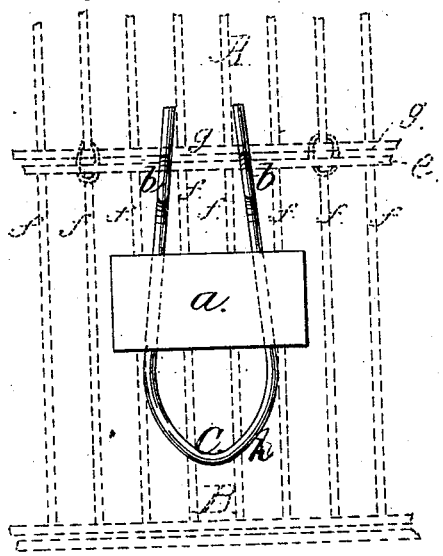
Figure 3:
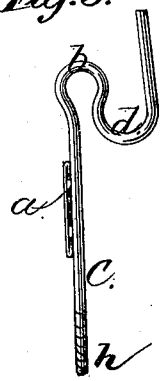

In the accompanying drawings, Figure 1 represents a vertical cross-section of a cage and its sliding door, showing the position of the fastener when the door is opened and when closed. Fig. 2 represents a front view of the fastener, showing its position with relation to the cage and the door, which are shown in dotted lines; and Fig. 3 represents a side view of the fastener.

Referring to the drawings, A represents a bird-cage having a sliding door, B, in this instance arranged to open by sliding upward. C represents the fastener, made of wire or sheet metal, and bent to form two double hooks, $b\ d$, at each end, the two ends being parallel, or nearly so, to bring the two hooks in line.

The device may, however, be made with but one double hook, $b\ d$, or with more than two, and forms a shank or handle, $h$, at the outer end.

In applying the fastener, the hook or hooks $b\ b$ are placed over the bar $e$ of the door and closed together partly or entirely around said bar $e$. Thus the fastener is hinged to the door. When the fastener is thus applied the hooks $d\ d$ are in position to pass under the bar $g$ of the cage, in the manner shown in Fig. 1, and by engaging the said bar $g$ prevent the door from being lifted.

To open the door, the fastener must be turned to bring its outer handle part $h$ over the hook $b$, thereby carrying the hooks $d\ d$ outward and clearing the bar $g$, as shown by dotted lines in Fig. 1, thus releasing the door from connection with the bar $g$. As soon, however, as the door is closed the fastener either turns by its own weight or it can be turned down and the hooks $d\ d$ passed under the bar $g$, fastening the door.

It will be observed that the hooks $d\ d$ do not entirely release the bar $g$ until the fastener is turned nearly upright, so that in operating it to unfasten the door it is necessary to turn it considerably above a horizontal position and hold it in that position until the bar to which it is hung is raised beyond the bar $g$ of the cage. This makes it impossible for the bird or other occupant of the cage to release the fastener or open the door.

I claim—

1. The fastener C, having the double hook $b\ d$, for combination with a cage and its door, substantially as herein shown and described.

2. In combination with the cage A, having bar $g$, and the sliding door B, the fastener C, having upper hook, $b$, lower hook, $d$, and handle $h$, substantially as herein shown and described.

THEODORE L. MAXHEIMER.

Witnesses:
 WILLIAM H. C. SMITH,
 WILLY G. E. SCHULTZ.